March 19, 1940.    J. K. BREWSTER    2,194,160
TRAILER STABILIZER
Filed Sept. 11, 1939    2 Sheets-Sheet 1
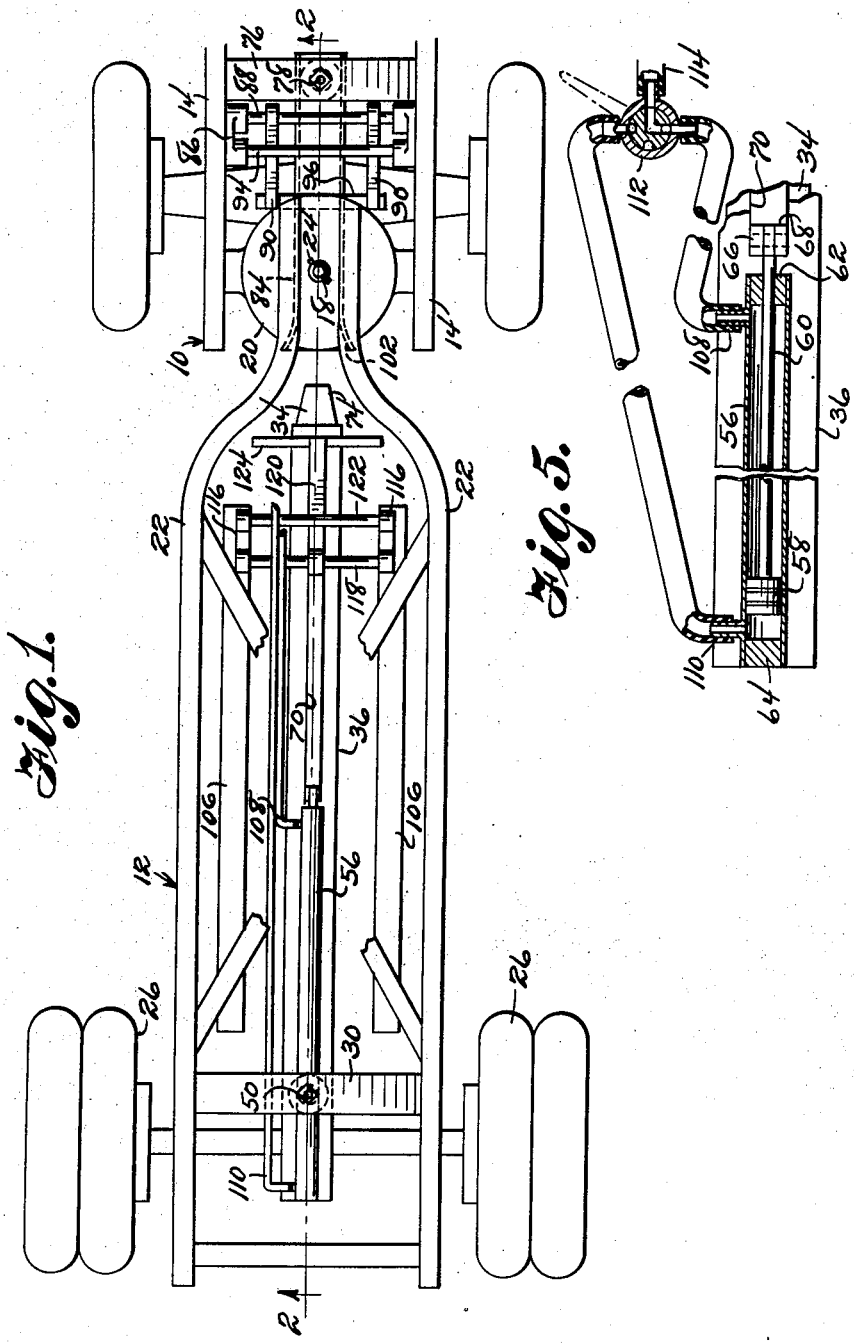
John K. Brewster
INVENTOR
BY Victor J. Evans & Co.
ATTORNEYS March 19, 1940.                J. K. BREWSTER                2,194,160
                              TRAILER STABILIZER
                           Filed Sept. 11, 1939         2 Sheets-Sheet 2
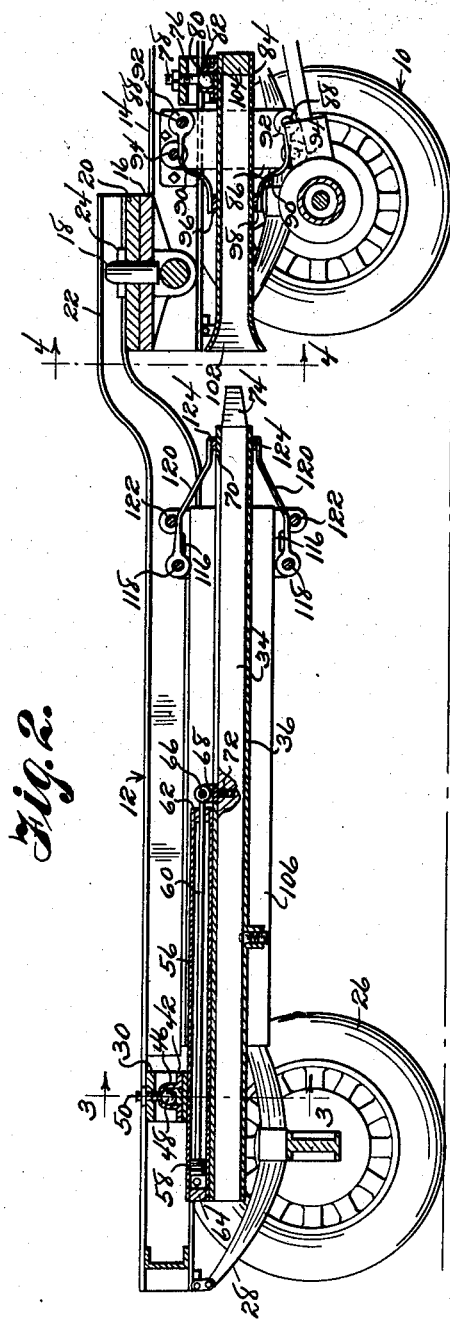
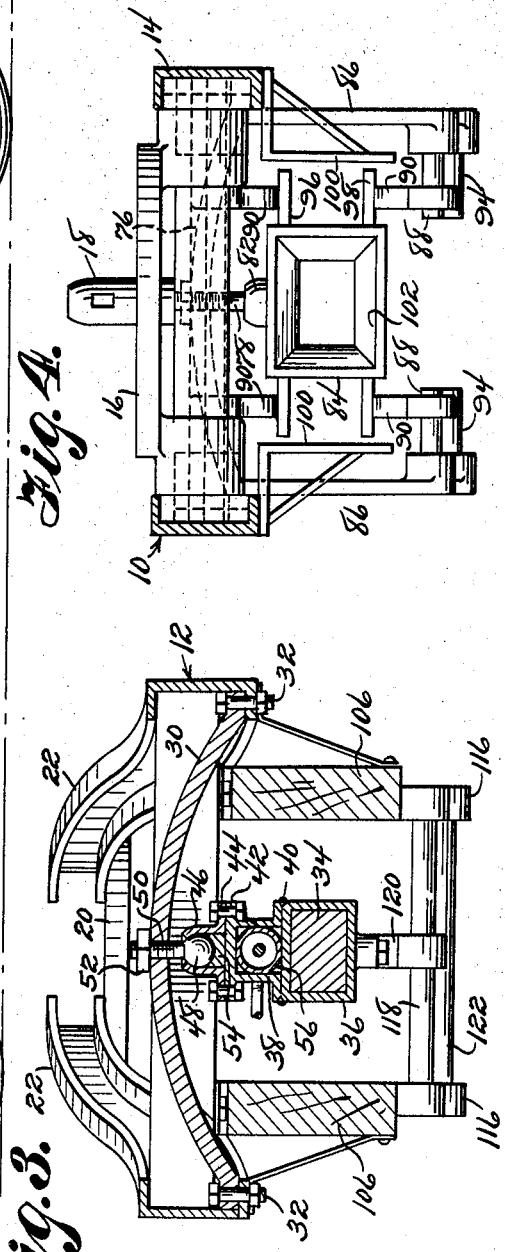
John K. Brewster
INVENTOR
BY Victor J. Evans & Co.
ATTORNEYS Patented Mar. 19, 1940

2,194,160

UNITED STATES PATENT OFFICE 2,194,160

TRAILER STABILIZER

John K. Brewster, Flint, Mich.

Application September 11, 1939, Serial No. 294,384

4 Claims. (Cl. 280—33.1)

My invention relates to trailers of the semi-trailer type to be pulled by tractors and other suitable vehicles, and has among its objects and advantages the provision of an improved stabilizer.

In the past, considerable difficulty has been experienced in connection with trailers of the semi-trailer type wherein the forward end of the trailer frame is pivotally connected with the rear end of the tractor or other vehicle for pivotal movement about a vertical axis. The tendency of such trailers to "jackknife", i. e., swing about its pivotal axis under various road and traffic conditions, is a constant danger to life and property. Jackknifing is all the more frequent when operating on highways covered with snow and ice, although jackknifing occurs even on dry highways. Traveling at an excessive speed causes whipping of the trailer, which at times develops in such degree as to be beyond the control of the operator. Frequently, the operator applies the brakes too fast, or the brakes grab, which tends to accelerate jackknifing of the trailer.

An object of my invention is to provide a stabilizer for a trailer of the type described, wherein novel means are provided to connect the trailer with the tractor at the will of the operator so as to completely eliminate jackknifing of the trailer under all conditions of highways and traffic conditions. The stabilizer is in the nature of a power operated beam slidably associated with the trailer and adapted to be extended into a correspondingly shaped housing on the tractor, with the telescopic relation between the beam and the housing such as to hold the trailer in line within a predetermined degree, but in which the beam and the housing are so devised as to embody the necessary element of flexibility so that the trailer and the vehicle may negotiate the average curve in addition to flexibly coupling the two units so as to facilitate entry of the beam.

In the accompanying drawings:

Figure 1 is a top plan view of a portion of a tractor and a semi-trailer connected therewith, with portions of the trailer broken away for the sake of clearness;

Figure 2 is a sectional view taken substantially along the line 2—2 of Figure 1;

Figure 3 is an enlarged sectional view along the line 3—3 of Figure 2;

Figure 4 is an enlarged view taken from the position indicated by line 4—4 of Figure 2 with the trailer detached from the tractor; and Figure 5 is a detail view of the power actuated piston for moving the beam to operative and inoperative positions.

In the embodiment selected to illustrate my invention, I make use of a conventional tractor, a portion of which is indicated at 10 in Figs. 1 and 2, and a conventional semi-trailer 12. Tractor 10 includes a frame structure 14 provided with a bearing plate 16 provided with a pin 18 which may be inserted through an opening in the bearing plate 20 mounted to the forward ends of the frame members 22 of the trailer. Pin 18 is provided with a key 24 which holds the plate 20 in assembled relation with the plate 16. Trailer 12 includes the usual supporting wheels 26 and springs 28 which carry the frame members 22. The structure so far described is entirely conventional and well known in the art.

To the frame members 22 of the trailer I bolt a cross member 30, as at 32 in Fig. 3. Cross member 30 supports the stabilizing beam 34 through the medium of a housing 36, with the beam slidable in the housing and the latter pivotally suspended from the cross member 30.

Referring to Fig. 3, a frame 38 is welded at 40 to the housing 36, and the frame is flanged at 42 for bolted connection with a flange 44 of a pivot housing 46 swingably connected with a head 48 on one end of a bolt 50 threaded through the member 39 and secured against accidental turning by a lock nut 52. A bearing element 54 is positioned in the pivot housing 46 and is contoured to fit snugly about a limited area of the head 48, with the housing similarly formed near its upper end so that the head 48 may be rotated relatively to the housing within a limited degree.

Upon the housing 36 I fixedly secure a cylinder 56 within which a piston 58 is slidably contained and connected with a piston rod 60 extending through the closure 62 in one end of the cylinder. The opposite end of the cylinder is also closed, as at 64. The outer end of the piston rod 60 is connected at 66 with a coupling member 68 riding in a slot 70 in the housing 36. Coupling member 68 is provided with a pin 72 anchored in an opening in the beam 34. Beam 34 is advanced and retracted through actuation of the piston 58, with Fig. 2 illustrating the normal position of the beam, at which time its tapered end 74 lies closely adjacent the forward end of the housing 36.

To the frame member 14 of the tractor 10 I connect a cross member 76 which corresponds to the cross member 30. A bolt 78 is connected to the cross member 76 and is provided with a head 80 rotatably associated with a housing 82 bolted to a housing 84 aligned with the beam 74. Bolt 78 and its head 80 together with the housing 82 are identical with the corresponding parts illustrated in Fig. 3 so that the housings 36 and 84 are mounted in the same manner with respect to their respective cross members 30 and 76. Plates 86 are connected with the frame members 14 and depend therefrom for supporting rods 88 upon which I mount springs 90 bearing against the upper and lower faces of the housing 84 for yieldingly supporting the housing in the normal position of Fig. 2. Springs 90 include eyes 92 at their forward ends for the reception of the rods 88, and the plates 86 carry rods 94 which hold the springs under a predetermined degree of flexure with respect to the housing 84, the springs being sufficiently stiff to support the housing in its normal position. Referring to Fig. 4, the upper springs 90 are interconnected through the medium of a bar 96 which lies against the upper face of the housing 84, and a bar 98 interconnects the lower springs 90, which latter bar bears against the lower face of the housing 84. Thus, the housing 84 may pivot about the axis of the bolt 78 without impairing the spring tension effective thereon, but the pivotal movement of the housing is limited by reason of stop members 100 which may be bolted to the frame members 14.

Housing 84 is flared at 102 to facilitate entry of the beam 34, and the tapered end 74 further facilitates entry. Springs 90 yieldingly support the housing 84 so that it may yield within limited degrees to provide accommodation for the beam 34 in the event that the road conditions are such as to position the beam slightly out of alignment with the housing 84 during coupling of the trailer with the tractor. The slot 70 in the housing 36 is of sufficient length to accommodate the necessary projection of the beam 34, and the beam is projected substantially half its length inside the housing 84, with the latter provided with a closure 104 in its forward end. With the beam 34 projected forwardly its maximum distance, substantially half its length remains in the housing 36 so that the two housings are so telescopically related to the beam as to provide a durable joint.

Housing 36 may pivot within a limited range about the axis of the bolt 50, but the free pivotal movement is limited by reason of stop members 106 bolted to the frame structure of the trailer. Stop members 106 are arranged in the path of the housing 36 to engage the latter after a limited pivotal movement in either direction. Thus, the tractor and its associated trailer may negotiate average curves in the highway, but the two units will be so connected upon projection of the beam 34 as to completely prevent jack-knifing of the trailer.

Cylinder 56 is provided with two conduits 108 and 110 communicating with the two ends of the cylinder for the admission of a pressure fluid which may comprise compressed air supplied by the air compression facilities of the tractor. The admission of air to one or the other end of the cylinder 56 is controlled through the medium of a valve 112 adapted to be manipulated by the driver of the tractor for advancing or retracting the beam 34. Conduits 108 and 110 may comprise flexible hose and the valve 112 may be connected with the air storage chamber through the medium of a conduit 114. It will thus be seen that the movement of the piston 58 may be controlled by the valve 112, and the direction of travel will depend upon which conduit is opened for the admission of compressed air. Obviously, the piston may be actuated through the medium of fluid under pressure in lieu of compressed air.

To the stop members 106 I connect brackets 116 which support rods 118 connected with springs 120 respectively of the same type as illustrated at 88 and 90, with the springs 120 held under flexure by rods 122 carried by the brackets 116. Cross bars 124 are associated with the springs 120 so as to maintain spring tension in all lateral positions of the housing 36, with the housing yieldable vertically in the same manner as the housing 84 to facilitate coupling of the beam 34 with the housing 84.

Having thus described certain embodiments of my invention in detail, it is, of course, understood that I do not desire to limit the scope thereof to the exact details set forth except in so far as those details may be defined in the appended claims.

I claim:

1. The combination of a tractor having a trailer connected therewith for pivotal movement about a vertical axis, a housing carried by said tractor, a second housing carried by said trailer, a beam slidable in said second housing and adapted to be projected into said first housing to limit the pivotal action of the trailer, means for advancing the beam into connected relation with said first housing and for retracting the beam to its normal position with respect to said second housing, said first housing being pivotally connected with said tractor, and resilient means for biasing said first housing to its normal position.

2. The combination of a tractor having a trailer connected therewith for pivotal movement about a vertical axis, a housing carried by said tractor, a second housing carried by said trailer, a beam slidable in said second housing and adapted to be projected into said housing to limit the pivotal action of the trailer, means for advancing the beam into connected relation with said first housing and for retracting the beam to its normal position with respect to said second housing, and a pivotal connection between said second housing and the trailer.

3. The combination of a tractor having a trailer connected therewith for pivotal movement about a vertical axis, a housing carried by said tractor, a second housing carried by said trailer, a beam slidable in said second housing and adapted to be projected into said first housing to limit the pivotal action of the trailer, means for advancing the beam into connected relation with said first housing and for retracting the beam to its normal position with respect to said second housing, a pivotal connection between said second housing and the trailer, and resilient means for biasing the second housing to its normal position.

4. The combination of a tractor and a trailer connected with the tractor for pivotal movement about a vertical axis, a first tubular member carried by said tractor, a universal connection between the first tubular member and said tractor, resilient means for biasing the first tubular member to its normal position, including means for limiting the pivotal action thereof in a horizontal plane, a second tubular member carried by said trailer, a universal connection between said second tubular member and the trailer, means for biasing the second tubular member to a normal position, including means for limiting the pivotal action of the second tubular member in a horizontal plane, a beam slidable in said second tubular member and adapted to be projected into said first tubular member for coaction with the first and second tubular members to restrain the trailer from pivotal movement beyond a predetermined degree, and manually controlled means for actuating said beam.

JOHN K. BREWSTER.